United States Patent [19]

Chiche

[11] 4,124,958
[45] Nov. 14, 1978

[54] SPHERICAL JUNCTION ELEMENT FOR COMPOSABLE DISPLAY STRUCTURES

[75] Inventor: René Chiche, Paris, France

[73] Assignee: Rufuss Establishment, Mauren, Liechtenstein

[21] Appl. No.: 814,870

[22] Filed: Jul. 12, 1977

[51] Int. Cl.² ............................................. E04B 1/00
[52] U.S. Cl. ......................................... 52/285; 46/31; 312/140
[58] Field of Search .............. 52/285; 46/31; 211/188, 211/194; 312/140; 108/111

[56] References Cited

U.S. PATENT DOCUMENTS

| | | | |
|---|---|---|---|
| 1,398,852 | 11/1921 | Gilbert | 46/31 |
| 3,002,315 | 10/1961 | Kahn | 46/31 |
| 3,528,559 | 9/1970 | Miller | 52/285 |
| 3,564,758 | 2/1971 | Willis | 46/31 |
| 3,861,112 | 1/1975 | Caroselli | 52/285 |
| 3,913,289 | 10/1975 | Recker | 46/31 |

FOREIGN PATENT DOCUMENTS 2,326,730 12/1974 Fed. Rep. of Germany ........... 108/111

*Primary Examiner*—Price C. Faw, Jr.
*Assistant Examiner*—Henry Raduazo
*Attorney, Agent, or Firm*—Sherman & Shalloway

[57] ABSTRACT

A spherical junction element for composable display structures, comprising a body having at least one partially spherical outside surface, at least one flat outside surface intersecting the partially spherical surface, at least one slot in said partially spherical surface, which is perpendicular to at least one of the flat surfaces for fittingly receiving therein a plate like component member and for defining a base plane with at least one of the flat surfaces, a pin in the slot having a diameter less than the gap of the slot, and a reinforcing sleeve element pulled over the pin, the sleeve element being provided with two or more surface portions to engage the mating surface portions of the slot.

3 Claims, 10 Drawing Figures

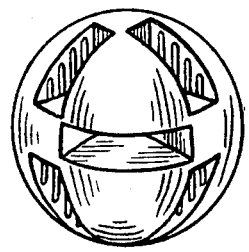
PRIOR ART
Fig.1
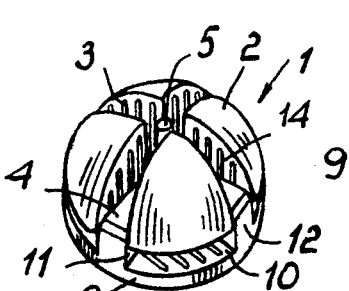
Fig.2
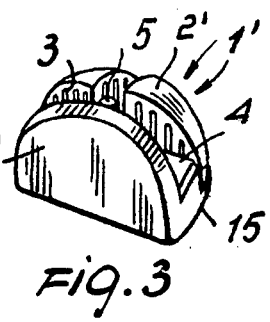
Fig.3
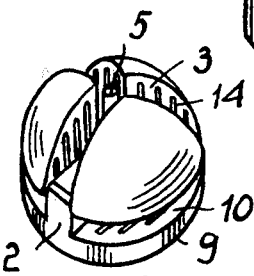
Fig.5
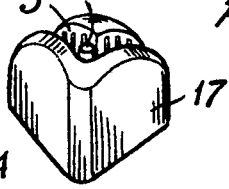
Fig.4
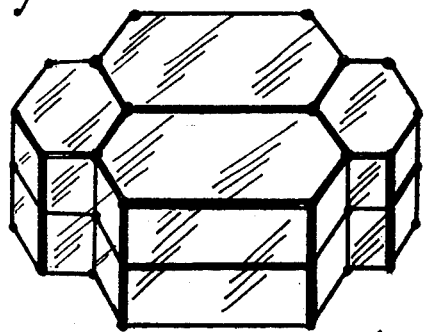
Fig.8
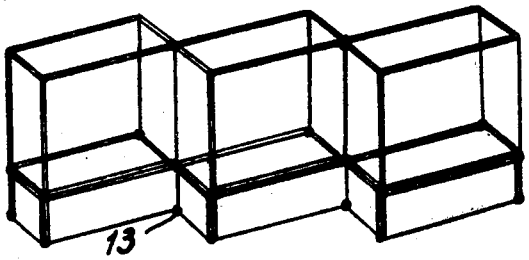
Fig.9
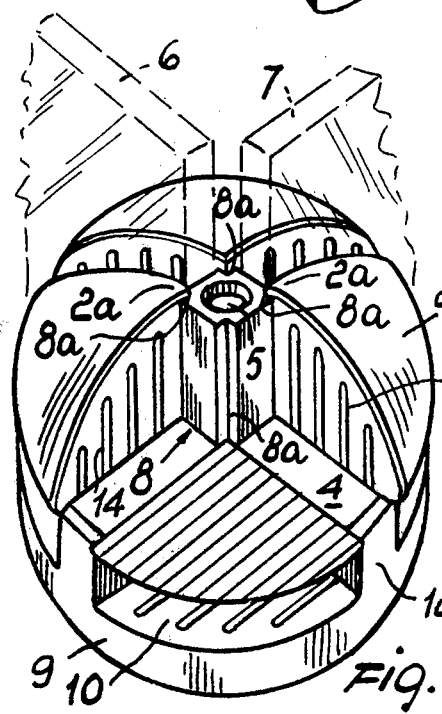
Fig.6
Fig.7
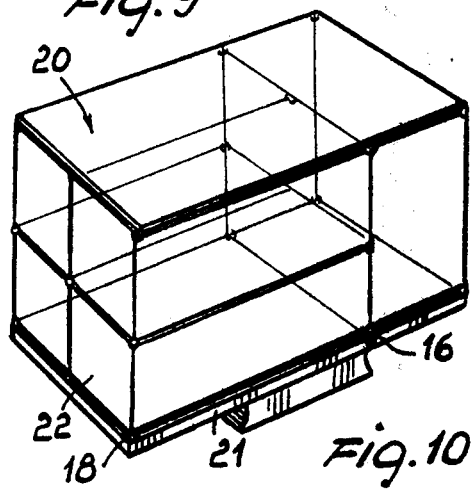
Fig.10

SPHERICAL JUNCTION ELEMENT FOR COMPOSABLE DISPLAY STRUCTURES

BACKGROUND OF THE INVENTION

This invention relates to spherical junction elements for composable display structures.

Entirely spherical junction elements for composable display structures are known in the art.

Such entirely spherical junction elements are provided with a number of slots extending parallel to respective meridian planes of the sphere and one slot extending parallel to the equatorial plane of the sphere. In some of the slots web portions are provided to maintain the material connection between the parts of the sphere divided by the slots. Usually such web portions extend according to diameters of the sphere corresponding to the respective slot and meridian or equatorial plane. The slots are adapted to receive corner portions of plate elements forming the composable display strusture. The plate elements are usually of glass or of transparent plastic material, but may be made of any suitable material including metal or wood. The spherical junction element is preferably made of a plastic material.

Heretofore the different slots provided in the entirely spherical junction element were all perpendicular to each other so that the maximum number of coner portions the junction element was capable of connecting together, was 12, of which four corner portions were part of four plate elements lying in one single base plane and eight corner portions were part of eight plate elements perpendicular to the base plane and four perpendicular also to each other. Instead of some of the diametral web portions provided in the slots, pin configurations were provided to define stop portions for the edges of the relevant plates of the display structure. Such pin configurations could be easily cut away in order to provide a through slot if desired for cases where one of the plates is received in the through slot in an intermediate point of the plate edge.

A drawback of the entirely spherical junction elements of the known art is their unsuitability in those points of the composable display structure, where less than twelve plate elements converge with their corners in a single point in the manner defined by the slots of the entirely spherical junction element.

In such points where only three plate elements perpendicular to each other converge into a corner point of the display structure, it is evident that only three respective slots of the entirely spherical junction element will receive the respective corner portions of the plate elements of the composable display structure. The remaining slots of the junction element will thus remain unused and will project like a spherical protuberance from the corner of the display structure.

In order to obviate this drawback it has already been proposed to provide series of entirely spherical junction elements having a diversified number of slots provided therein, so that there was always the possibility to select an entirely spherical junction element with the needed number of slots for the portion of the display structure where the junction element has to be used, the remaining portion of the junction element remaining solid and protruding spherically from the considered point of the display structure.

It will be understood that this solution did not eliminate the drawback of the spherical protuberance of the junction element at the outside corners of the display structure.

The shortcoming of such spherical protuberances affected remarkably the possibility of use of a display structure provided with entirely spherical junction elements. In fact, when the display structure had to be supported on a base plate, this had to occur through the spherical protuberances of the junction elements provided on the bottom corners or edges of the display structure. Thus, on the one hand an interspace was formed between the supporting base plate and the bottom plate of the display structure and on the other hand it was not easy to fix the display structure on the base plate owing to the spherical shape of the protuberances resting on the base plate. In addition, owing to the spherical shape of the protuberances the entire load acting on such protuberances was concentrated in small spots, which could cause undesirable deformations on the base plate. Furthermore, in the interspace between the bottom plate of the display structure and the base plate impurities could easily accumulate which could not be cleaned away easily, without removing the entire display structure from the base plate.

Moreover, in cases where display structures had to be approached to vertical walls, owing to the mentioned spherical protuberances of the junction elements it was not possible to avoid a gap between lateral plates of the display structure and vertical walls against which the display structure had to be leaned. Similar gaps or interspaces are formed in cases where more display structures had to be arranged in contact to each other, so that the effective space of the display structures was reduced, in addition to the undesirable interspaces.

SUMMARY OF THE INVENTION

An object of this invention is to obviate the above listed shortcomings of the known entirely spherical junction elements, by providing a junction element which avoids spherical protuberances from the outside corner points of the display structure, through which the gaps between contacting structure is reduced to a minimum and through which an easy fixing on base plates is possible and through which the load acting on the junction elements supported on a base plate is distributed over a larger area, so that the a concentration of local forces is avoided.

A further object is to provide stop members in the junction element, which, while being easily removable, are nevertheless highly resistant and capable of supporting great loads.

These and other objects which will appear from the description which follows are attained by a spherical junction element for composable display structures comprising a body having at least one partially spherical outside surface and at least one flat outside surface intersecting said partially spherical surface and at least one slot in said partially spherical surface perpendicular to at least one said flat surface for fittingly receiving therein a plate like component member and for defining a base plane with at least one said flat surface.

BRIEF DESCRIPTION OF THE DRAWING

Some preferred embodiments of the invention will be described with reference to the accompanying drawing in which:

FIG. 1 shows an entirely spherical junction element according to the known art;

FIGS. 2-6 show different embodiments of the spherical junction elements according to the invention, in perspective views;

FIG. 7 shows a spherical junction element in enlarged scale, in perspective view, with a portion cut away for the sake of clearance;

FIG. 8 shows a diagrammatic perspective view of a particular display structure obtained with the spherical junction elements of this invention;

FIGS. 9 and 10 show diagrammatic perspective views of other possible composable display structures obtained with the junction element of this invention.

DESCRIPTION OF PREFERRED EMBODIMENTS

With reference to the drawing, FIG. 2 shows a spherical junction element according to this invention indicated generally with reference numeral 1, in which the spherical portion is in the form of a semisphere 2 in which a through slot 3 parallel to a meridian plane is provided. A through slot 4 parallel to a second meridian plane perpendicular to the meridian plane of slot 3 is also provided. The two slots 3 and 4 intersect each other in a central zone of the semisphere. In this central zone a pin 5 is provided, which acts as a stop for the corner portions of the plates 6 and 7 shown in dashed lines in FIG. 7. The pin 5 may be easily cut away if the junction element should be arranged in an intermediate point of one of the plates 6 or 7. If the pin 5 has to act as a stop a reinforcing sleeve element 8 is preferably pulled over the pin 5. The sleeve element 8 is provided at its corners with recesses 8a, in which the edges 2a of the intersecting surfaces of the slots are received. In this way a highly resistent stop member is obtained, capable of supporting considerable loads and at the same time easily removable. The sleeve 8 is preferably made of plastic material.

The junction element of FIG. 2 has a flat surface 9 parallel to an equatorial plane of the semisphere. There is provided in the junction element a further slot 10 parallel to the equatorial plane of the semiphere. Web portions 11 and 12 are provided in the slot 9 and extend parallel to the diameters corresponding to the slots 3 and 4, forming thus a cross within the slot 9, maintaining together the body parts of the junction element divided by the slots.

The junction element of FIG. 2 is suitable for connecting the plates of a display structure converging in an outside corner such as the one indicated with reference numeral 13 in FIG. 9, where two bottom plates and four vertical plates converge.

It will be appreciated that owing to the flat equatorial surface 9 of the junction element, there is no spherical protuberance downwards from the bottom plate of the structure, so that the equatorial face 9 of the junction element can easily rest on a base plate below the display structure and, if desired the junction element can be easily fixed on such base plate, for instance by glueing the equatorial face 9 on the base plate.

The walls of the slots are provided with ribs 14 suitable for enhancing the engagement between a plate element inserted therein and the junction element.

FIG. 3 shows an embodiment of a junction element 1', in which the spherical surface 2' is in the form of a spherical sector delimited by two flat surfaces perpendicular to each other, one parallel to a equatorial plane 9' and the other to a meridian plane 15 cutting the equatorial plane 9' in half.

The junction element of FIG. 3 is suitable to be used in a corner such as corner 16 of FIG. 10, displaying towards the bottom its flat surface 9' and towards the front its flat surface 15.

FIG. 4 shows an embodiment of the junction element 17 provided with three flat surfaces, which may be suitably used for instance in the corner 18 of FIG. 10.

From FIG. 10 it may be easily appreciated that the display structure indicated generally with reference numeral 20 may be easily supported on the base plate 21, so that the gap between the base plate 21 and the bottom plate 22 of the display structure is much reduced. In addition, all junction elements engage the base plate 21 with their flat surfaces, which, if desired may be glued thereon before the assembling operation, in order to facilitate the same and in order to avoid undesired sliding movements of the display structure on the base plate 21. It will be appreciated that on all outside corners of the display structures the junction elements are so selected that there is no spherical protuberance projecting towards the outside of the display structure, so that such structure may be easily leaned against vertical walls or more display structures joined close to each other, without forming undesirable gaps therebetween increasing thereby the occupied space in addition to the inconvenience of contaminations by impurities of the open gaps.

Furthermore, it will be understood that a junction element and the display structure component parts as shown, allow an easy assembling of the component parts and a much closer arrangement of the plate elements at the corners.

FIGS. 5 and 6 show embodiments of the spherical junction element according to this invention, in which the slots are arranged at an angle of 120 degree with respect to each other.

A display structure of the kind shown diagrammatically in FIG. 8 may thus be obtained with such junction elements.

Also in this structural embodiment only the flat surfaces of the junction elements are turned towards the outside of the corners of the display structure, so that the same advantages described above are obtained.

Although the present invention has been described and illustrated in connection with preferred embodiments, it will of course be understood that modifications and variations may be resorted to without departing from the spirit of the invention, as those skilled in this art will readily understand. Such modifications and variations are considered to be within the perview and scope of the present invention as defined by the appended claims.

I claim:

1. A spherical junction element for composable display structures, comprising a body having at least one partially spherical outside surface, at least one flat outside surface intersecting said partially spherical surface, at least one slot in said partially spherical surface perpendicular to at least one said flat surface for fittingly receiving therein a plate like component member and for defining a base plane with at least one said flat surface, a pin in said slot having a diameter less than the gap of said slot, and a reinforcing sleeve element pulled over said pin, said sleeve element having at least two surface portions adapted to engage mating surface portions of said slot.

2. The junction element according to claim 1, wherein said body has one semispherical surface and one flat surface parallel to an equatorial periphery line of said semispherical surface, a first slot extending parallel to said flat surface, a second slot perpendicular thereto and parallel to a meridian line of said semispherical surface, and a third slot perpendicular to said second slot and intersecting it, said pin being in the intersection zone of said second and said third slots, and said reinforcing sleeve element having a substantially rectangular cross-section and having groove formations on the edges thereof adapted to receive corner portions of the intersection edges of said second and said third mutually intersecting slots thereby to provide resistant support of said sleeve element against said corner portions and wherein said first slot has radial web portions therein, extending parallel to said second and said third slots, respectively.

3. The junction element according to claim 1, wherein the partially spherical surface is a spherical sector delimited by two semi equatorial flat surfaces perpendicular to each other and having a first slot parallel to one said semi equatorial flat surface, a second slot parallel to another said semi equatorial flat surface, and a third slot parallel to a meridian line of the spherical sector and perpendicular to both said first and second slots, said pin in an intersection zone between said third slot and one of said first and second slots, said sleeve element having a polygonal cross-section and grooves on the edges thereof for receiving corner portions therein of intersecting edges of the intersection between said third slot and one of said first and second slots.

* * * * *